United States Patent [19]

Touma et al.

[11] Patent Number: 4,987,435

[45] Date of Patent: Jan. 22, 1991

[54] COMPACT CAMERA WITH APPARATUS SIZE ADJUSTMENT BY ZOOMING

[75] Inventors: Kiyoshi Touma; Takashi Shimamura, both of Tokyo, Japan

[73] Assignee: Copal Company Limited, Tokyo, Japan

[21] Appl. No.: 495,694

[22] Filed: Mar. 19, 1990

[30] Foreign Application Priority Data

Mar. 29, 1989 [JP] Japan .................................. 1-77808
Mar. 29, 1989 [JP] Japan .................................. 1-77811

[51] Int. Cl.$^5$ .......................... G03B 9/08; G03B 13/32
[52] U.S. Cl. .............................. 354/195.11; 354/230; 354/234.1
[58] Field of Search ............... 354/195.11, 230, 232, 354/400, 233, 234.1, 250, 270, 271.1; 350/429, 439

[56] References Cited

U.S. PATENT DOCUMENTS

| | | | |
|---|---|---|---|
| 4,274,725 | 6/1981 | Gross | 354/195.11 |
| 4,572,645 | 2/1986 | Yoshida et al. | 354/230 |
| 4,822,137 | 4/1989 | Goertz et al. | 354/195.11 |
| 4,865,433 | 9/1989 | Okajima et al. | 354/195.11 |

*Primary Examiner*—A. A. Mathews

*Attorney, Agent, or Firm*—Sixbey, Friedman, Leedom & Ferguson

[57] ABSTRACT

A compact camera has a zooming lens system for regulating a focal distance and a shutter blade member for opening and closing the lens system. The blade member is shifted forwardly from its rest position to open the lens system through a given shift amount effective to determine a lens aperture size to effect exposure, and subsequently is shifted reversely to close the lens system to return to the rest position. A driving mechanism is connected to the blade member to undergo a reciprocating stroke to drive the blade member forwardly and reversely to effect opening and closing of the lens system. The blade member and the driving mechanism are disposed on a substrate. An adjusting mechanism is disposed around the substrate. The adjusting mechanism includes a stopper member undergoing displacement in response to the zooming of the lens system. The stopper member acts on the driving mechanism to control the reciprocating stroke of the driving mechanism according to the displacement of the stopper member so as to limit the shift amount of the blade member to thereby effect adjustment of the lens aperture size according to the lens focal distance or the zooming. Generally, the adjustment is carried out such as the smaller the focal distance, the smaller the lens aperture size.

12 Claims, 9 Drawing Sheets

COMPACT CAMERA WITH APPARATUS SIZE ADJUSTMENT BY ZOOMING

BACKGROUND OF THE INVENTION

The present invention relates to a compact camera provided with automatic focusing function (hereinafter, referred to as "AF"), automatic exposure function for automatically controlling exposure aperture and exposure time interval of a shutter (hereinafter, referred to as "AE") and zooming function for effecting zooming according to a distance from an object, and more specifically relates to adjustment of the shutter aperture size.

The conventional compact camera of the above noted type is provided with an actuator such as electromagnetic actuator of the moving magnet type and stepping motor for generating bidirectionally a driving torque effective to carry out continuous open and close driving of a shutter blade. The driving torque is transmitted through an operating mechanism to the blade to effect AE. The conventional camera is also provided with a zooming mechanism separately from the AE mechanism.

However, in the conventional camera having the zoom lens system with the lens shutter, the lens aperture size or lens stop diameter is held constant without regard to change of focal distance by zooming so as to eliminate complicated aperture size control. However, since F number is determined by F=aperture size/focal distance, F number is considerably varied between short focal distance state and long focal distance state in a lens system having great zoom ratio when the aperture size is held constant. In view of recent trend of the market, the lens system has small F number in the long focal distance state in order to obtain bright condition. Therefore, the lens system has a significantly great aperture size in the short focal distance state, thereby adversely hindering quality of image reproduction. Accordingly, freedom of the lens system design is limited so that a number of lens pieces may be added or nonproductive shape and strict accuracy may be required to ensure a desired performance, thereby affecting size of camera and production cost. Further, if not using such highly sophisticated lens system, there is caused drawback that a desired quality of the photographic image cannot be obtained because the aperture size is not adjusted according to the change of focal distance in addition to the above noted reason.

SUMMARY OF THE INVENTION

In order to solve the above noted problem of the prior art, an object of the present invention is to provide a compact camera constructed to enable adjustment of the lens aperture size according to the change of the focal distance.

In order to achieve the object, according to the present invention, the compact camera is comprised of a lens system effective to enable zooming to change a focal distance, and a blade member for effecting opening and closing of the lens system. The blade member or sector is driven to shift from its rest position forwardly during exposure operation so as to open the lens aperture through a given shift amount which determines an effective aperture size. Then, the sector is driven to shift reversely to close the lens system to return to the rest position. A driving mechanism is connected to the sector for effecting a given reciprocative stroke to drive the sector forwardly and reversely to carry out opening and closing shifts thereof. These sector and driving mechanism are disposed on a substrate. An adjusting mechanism is disposed around the substrate. The adjusting mechanism includes a stopper displaceable in response to the zooming operation of the lens system. The stopper directly acts on the driving mechanism to control the stroke thereof according to the displacement of the stopper to limit the shift amount of the sector so as to enable the adjustment of aperture according to the variation of focal distance of the lens system due to zooming operation. Generally, the adjustment is effected such that the shorter the focal distance, the smaller the lens aperture size and the degree of variation can be determined according to the optical performance of the lens system.

DETAILED DESCRIPTION OF THE INVENTION

Figure 1:
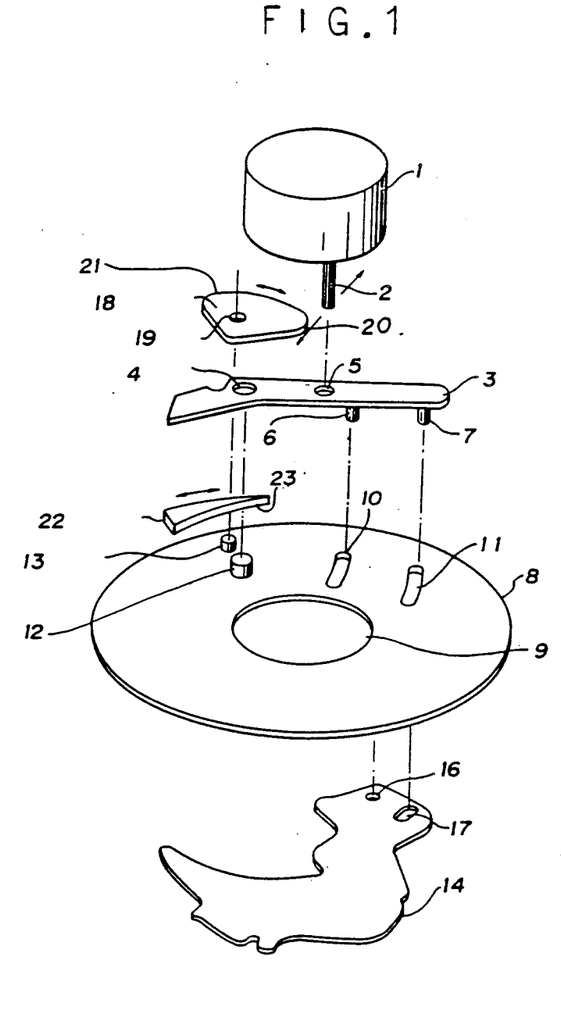
FIG. 1 is an exploded perspective view of a shutter in a first embodiment of the inventive camera.

Hereinafter, the present invention will be described in detail with reference to the drawings. FIG. 1 is an exploded perspective view showing a shutter part for effecting AE in a first embodiment of the inventive camera. As shown in the figure, an actuator is composed, for example, of an electromagnetic actuator 1 of the moving magnet type. An actuating pin 2 is provided on the bottom of the actuator 1 to undergo a reciprocating stroke with a given torque along a predetermined path in forward and reverse directions as indicated by the arrow. An operating mechanism is comprised of an operating lever 3 which is formed with a pivot hole 4 and a slot 5 engageable with the actuating pin 2. A pair of operating pins 6 and 7 are vertically disposed under the lower face of the operating lever 3 in remote location from the pivot hole 4. The operating lever 3 is connected to undergo pivotal movement around the pivot hole 4 in forward and reverse directions along a given path in response to the reciprocating stroke movement of the actuating pin 2.

A substrate 8 has a central opening 9 for a lens system and a pair of escape holes 10 and 11 for escaping the operating pins 6 and 7 downward. A pivot pin 12 is erected on the upper face of the substrate 8 for engaging with the pivot hole 4 to support the operating lever 3, and another pivot pin 13 is also disposed on the substrate 8. A pair of blade 14 and blade 15 (not shown) are disposed under the lower face of the substrate 8. The blade 14 is formed with a pivot hole 16 and an elongated slot 17. The blade 14 is rotatably mounted through the pivot hole 16 on the substrate 8 and is engaged with the operating pin 7 through the slot 17. According to the pivotal movement of the operating lever 3, the blade 14 is angularly shifted relative to the opening 9 in opening and closing directions to effect shuttering.

The stopper is comprised of a stop cam 18 operable to control the reciprocating stroke of the actuating pin 2 of the actuator 1, and having a pivot hole 19. The stop cam 18 is rotatably engaged with the pivot pin 13 on the substrate through the pivot hole 19 as indicated by the arrow. Further, the stop cam 18 has a first cam face 20 which can abut to the actuating pin 2 when the stop cam 18 enters the path of the actuating pin 2 and a second cam face 21.

An adjusting member in the form of an adjusting cam 22 is disposed around the substrate 8 to adjust an angular position of the stop cam 18. The adjusting cam 22 is fixed along an inner circumference of a movable cylinder (not shown), and undergoes the displacement as indicated by the arrow with the circumferential movement of the cylinder. The adjusting cam 22 has a cam face 23 which can be brought into abutment with the second cam face 21 of the stop cam 18 to adjust the angular position of the stop cam 18.

Figure 2:
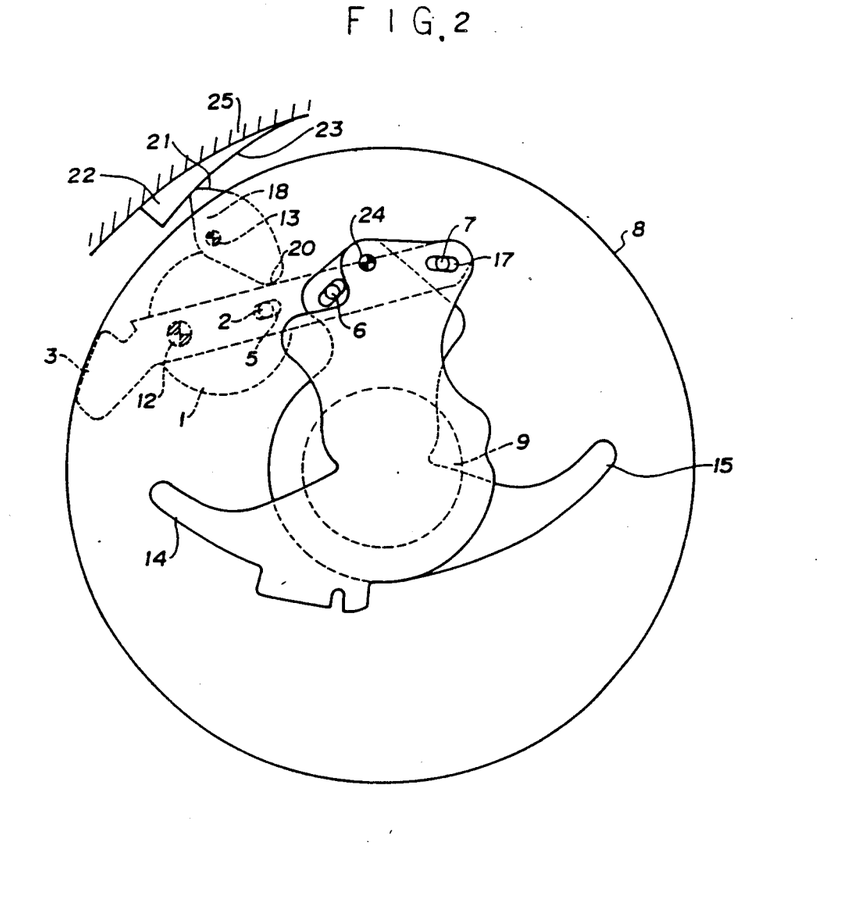
FIG. 2 is a plan view showing closed state of the FIG. 1 lens shutter.
Figure 3:
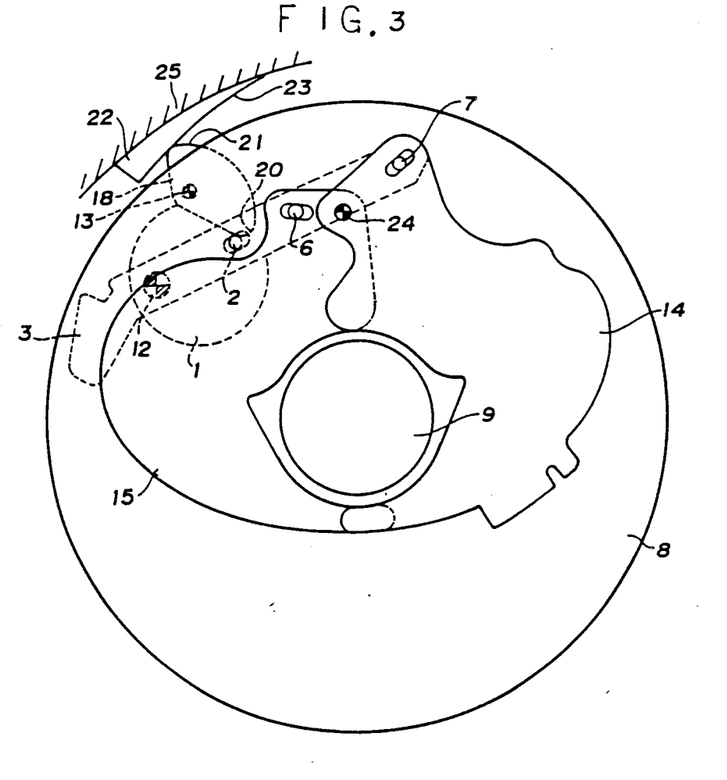
FIG. 3 is a plan view showing open state thereof.

FIG. 2 is a plan view of the shutter part after the setup of components of FIG. 1 embodiment, which is viewed from the lower side of the substrate to indicate the shutter closed state, and FIG. 3 is another plan view thereof to show the shutter open state. As shown in FIG. 2, the pair of blades 14 and 15 are rotatably supported around a common pivot pin 24 erected on the substrate 8, and are placed by the respective operating pins 6 and 7 in their rest position over the center of the substrate in superposed relation to each other to completely close the opening 9. The operating lever 3 pivotably supported around the pivot pin 12 is also placed in its rest position most clockwise in the drawing by the actuating pin 2 of the actuator 1. Further, the actuating pin 2 is set in its rest position most clockwise in the drawing.

In this arrangement, the adjusting cam 22 is fixed to the movable cylinder 25 disposed around the substrate 8, and is disposed in a given position according to the circumferential movement of the cylinder 25 during the zooming operation so that its cam face 23 is brought into abutment with the second cam face 21 of the stop cam 18. As a result, the angular position of the stop cam is set according to the change of focal distance due to the zooming. According to the set angular position, the first cam face 20 of the stop cam 18 enters the forward movement path of the actuating pin 2 to stop or block the same such that the distance between the first cam face 20 and the rest position of the actuating pin 2 determines the effective stroke in the forward movement of the actuating pin 2.

Figure 5:
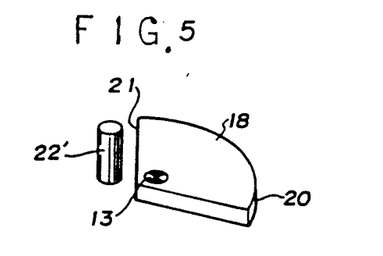
FIG. 5 is a perspective vie showing another example of a stopper according to the present invention.

In this embodiment, the adjusting cam 22 fixed to the movable zoom cylinder 25 is utilized to adjust the stop cam 18; however, a pushing member such as an adjusting pin 22' can be used instead of the adjusting cam as shown in FIG. 5. The adjusting pin 22' is linked to the movable cylinder 25 through a linkage (not shown) so as to push the stop cam 18 to set its angular position.

FIG. 3 is a plan view showing shutter open state in which the pair of blades 14 and 15 have been shifted from the FIG. 2 rest position to the open position. As shown in the figure, the operating lever 3 is rotated counterclockwise from its rest position so that the pair of blades 14 and 15 are separated from each other and angularly shifted around the common pivot pin 24 away from the opening 9 to thereby open the opening 9. The blades 14 and 15 are operated by means of the operating pins 7 and 6 inserted into the respective slots formed in the blades. On the other hand, the operating lever 3 is pivoted counterclockwise in the forward direction along the given path around the pivot pin 12 by means of the actuating pin 2. At this time, the actuating pin 2 moves from its rest or starting position counterclockwise in the forward direction along the given arcuate path.

In the state of FIG. 3, the first cam face 20 of the stop cam 18 is set such that the actuating pin 2 comes into abutment with the first cam face 20 to stop forward movement when the blades 14 and 15 reach their full open position. Accordingly, in this case, the effective aperture size of the lens system is adjusted to the full open diameter of the shutter according to the change of the focal distance due to zooming.

However, when reducing the aperture size of the lens system in response to the further change of the focal distance, the movable cylinder 25 is further rotated clockwise such that the cam face 23 of the adjusting cam 22 pushes the stop cam 18 so that its first cam face 20 further enters deeply the movement path of the actuating pin 2. Consequently, the first cam face 20 of the stop cam 18 further approaches to the rest position of the actuating pin 2 so as to cut the forward movement stroke of the actuating pin 2. As a result, the pair of blades 14 and 15 are stopped before they reach full open position due to the abutment of the actuating pin 2 against the first cam face 20 of the stop cam 18 to thereby establish optimum effective aperture size and the optimum exposure amount.

Figure 4:
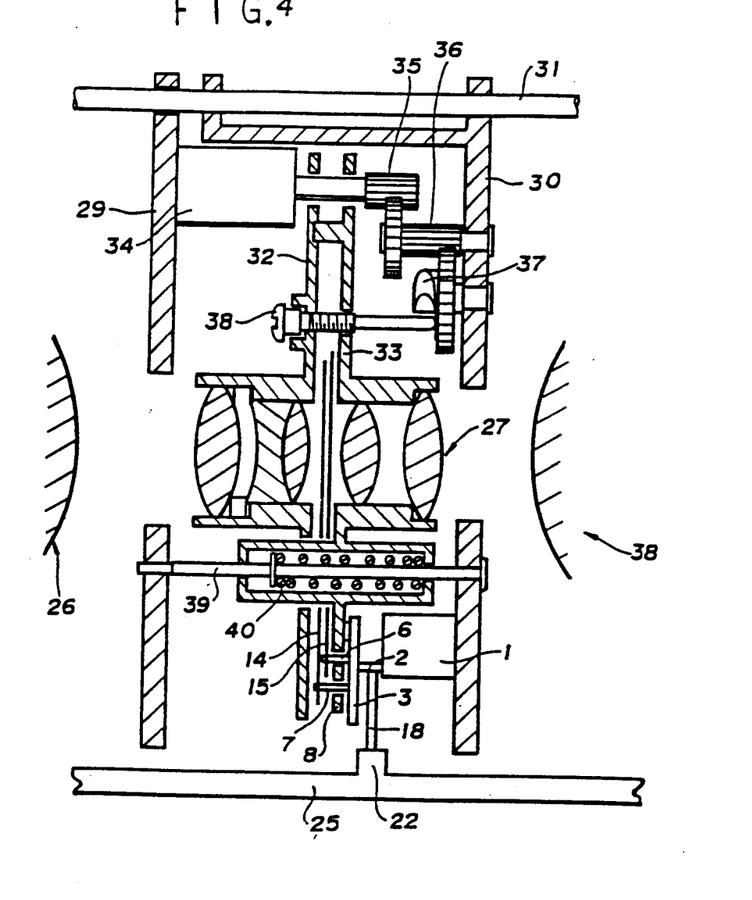
FIG. 4 is an expanded sectional view showing an essential part of the first embodiment of the inventive camera, taken along the optical axis thereof.

FIG. 4 is a sectional view showing a main part of the first embodiment of the inventive camera to illustrate AF mechanism, AE mechanism and part of zooming mechanism. A lens system is comprised of a first group 26 (partly shown) at the object side, a second group 27 in an axially intermediate position and a third group 28 (partly shown) at the film side. A front frame 29 and a rear frame 30 are spaced axially from each other and are guided along a zoom guide 31. A front lens sleeve 32 and a rear lens sleeve 33 are disposed between the front and rear frames 29 and 30 for supporting the second lens group 27, and are movable in the optical axis direction relative to the front and rear frames 29 and 30.

The AF mechanism is comprised of an AF stepping motor 34 fixed to the front frame 29, an AF cam 37 disposed on the rear frame 30 and driven by the stepping motor 34 through a pinion gear 35 and a transmission gear 36, an AF rod 38 disposed through opposed flange portions of the front and rear lens sleeves 32 and 33 and fixed at one end to the front lens sleeve 32 and in contact at the other end with the AF cam 37, an AF guide bar 39 fixed between the front and rear frames 29 and 30 along the optical axis to guide axial movement of the coupled front and rear lens sleeves 32 and 33, and a spring member 40 effective to bias the coupled front and rear lens sleeves 32 and 33 toward the rear frame 30.

Next, the zooming mechanism is comprised of a zooming means (not shown) for effecting manual or automatic zooming operation to displace the first lens group 26 and/or the third lens group 28 in the axial direction to change the focal distance of the lens system, a movable cylinder in the form of the zoom ring 25 responsive to the operation of the zooming means to undergo circumferential revolution, and an adjusting cam 22 fixed to or integrated with the inner periphery of the zoom ring 25 along its circumference.

Lastly, the AE mechanism is comprised of an electromagnetic actuator 1 of the moving magnet type mounted on the rear frame 30, a stop cam 18, an operating lever 3 and a pair of blades 14 and 15, the last four components being arranged on a substrate 8.

Referring to FIG. 4, the description is given for the sequential operation of AF, zooming and AE in the inventive camera device.

In the AF operation, a distance measurement means (not shown) is operated to measure a distance to the object so that a drive controlling circuit (not shown) applies signal pulses corresponding to a number of steps determined by the measured distance to the AF stepping motor 34. The AF stepping motor 34 is stepwise rotated to output torque effective to rotate the AF cam 37 through the pinion 35 and the transmission gear 36. The initial home position of AF cam 37 is set to upper or lower dead point according to the specification of the particular model of the camera. The AF rod 38 is displaced axially in response to the rotation of the AF cam 37 so that the front lens sleeve 32 is displaced forward along the AF guide bar 39 with the displacement of the AF rod 38 because the head screw portion of the AF rod 38 is coupled to the front lens sleeve 32. The rear lens sleeve 33 is concurrently displaced with the coupled front lens sleeve. However, the front and rear frames 29 and 30 are kept stationally in the axial direction. Only the front and rear lens sleeves 32 and 33 are displaced together with the blades 14 and 15 etc. In order to accurately control the axially forward displacement of the front and rear lens sleeves 32 and 33, these are always biased rearward by means of the spring member 40. In the AF operation, the maximum displacement span of the second lens group 27 is set about 2-3 mm in the compact camera. This maximum displacement span is divided into several tens steps to enable fine adjustment of focus.

In the subsequent zooming operation, the external zooming means (not shown) is operated according to the object distance to displace the first lens group 26 or third lens group 28 along the optical axis to set a desired focal distance. In response to this operation, the zoom ring 25 is revolved in the circumferential direction. Consequently, the adjusting cam 22 fixed to the zoom ring is made in contact with the stop cam 18 to advance the same into the reciprocating stroke path of the actuating pin 2 by a determined displacement.

Lastly, the AE operation is effected. According to the exposure light amount information and the exposure time interval information fed from an exposure control circuit (not shown), the electromagnetic actuator 1 is initiated so that the actuating pin 2 moves from its rest position in the forward direction along the predetermined path. Accordingly, the operating lever 3 and the blades 14 and 15 are coacted to start exposure. Subsequently, the actuating pin 2 comes into abutment with the stop cam 18 to stop its forward stroke so that the blades 14 and 15 are held at the most open state to define the effective lens aperture. After the exposure, the actuating pin 2 is moved rearward to return to the rest position to finish the exposure operation. Occasionally, the actuating pin 2 may not move far forward when the required exposure light amount is rather small. In such case, the actuating pin 2 may return to the rest position without abutment to the stop cam 18.

As described above, in the first embodiment, the reciprocating stroke of the electromagnetic actuator is adjusted effectively by the stop cam according to the set focal distance. By such construction, the aperture stop size of the lens system can be always set optimum, thereby eliminating the use of the complicated and precious lens system which would be needed in the prior art.

Figure 6:
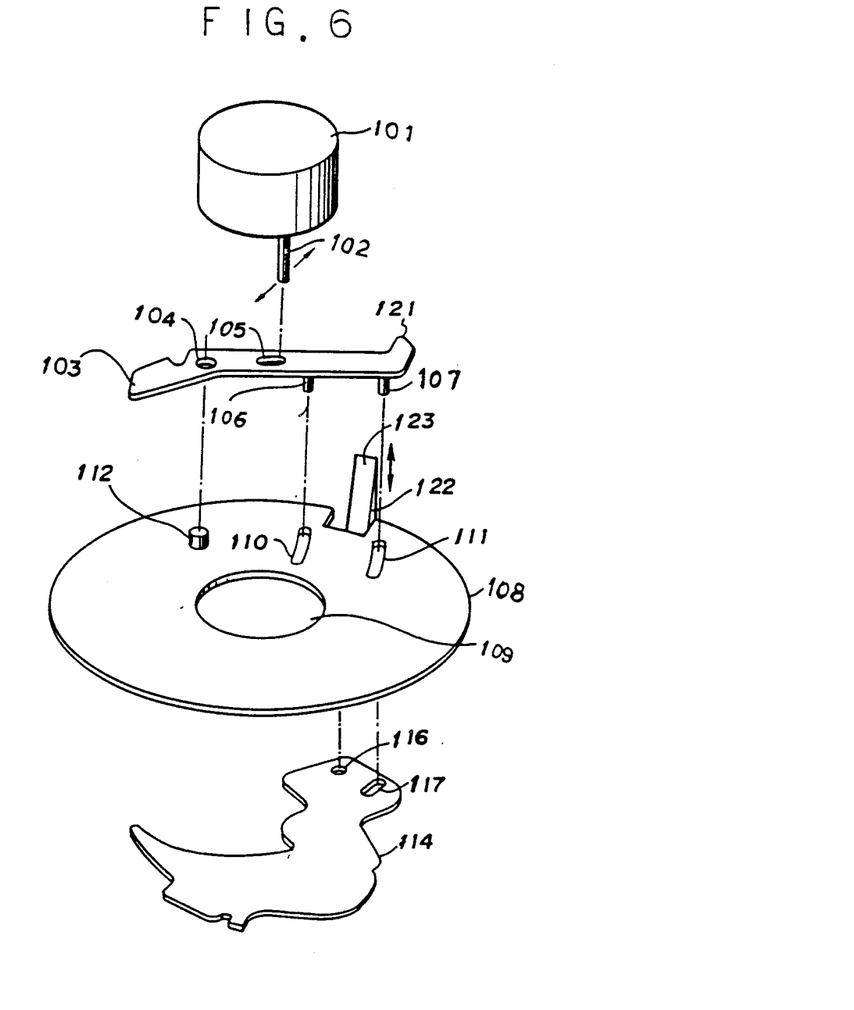
FIG. 6 is an exploded perspective view showing lens shutter part of a second embodiment according to the present invention.

Next, a second embodiment of the present invention will be described in detail. FIG. 6 is an exploded perspective view showing a shutter part for effecting AE in the second embodiment of the inventive camera. As shown in the figure, an actuator is composed, for example, of an electromagnetic actuator 101 of the moving magnet type. An actuating pin 102 is provided on the bottom of the actuator 101 to undergo an arcuate movement with a given torque along a predetermined path in forward and reverse directions as indicated by the arrow. An operating mechanism is comprised of an operating lever 103 which is formed with a pivot hole 104 and an elongated slot 105 engageable with the actuating pin 102. A pair of operating pins 106 and 107 are vertically disposed under the lower face of the operating lever 103 in remote location from the pivot hole 104. The operating lever 103 is connected to undergo pivotal movement around the pivot hole 104 in forward and reverse directions along a given path through a reciprocating stroke in response to the movement of the actuating pin 102.

A substrate 108 has a central opening 109 for a lens system and a pair of escape holes 110 and 111 for escaping the operating pins 106 and 107 downward. A pivot pin 112 is erected on the upper face of the substrate 108 for engaging with the pivot hole 104 to support the operating lever 103. A pair of blade 114 and blade 115 (not shown) are disposed under the lower face of the substrate 108. The blade 114 is formed with a pivot hole 116 and an elongated slot 117. The blade 114 is rotatably mounted through the pivot hole 116 on the substrate 108 and is engaged with the operating pin 107 through the slot 117. According to the pivotal movement of the operating lever 103, the blade 114 is angularly shifted relative to the opening 109 in opening and closing directions to effect shuttering.

In order to control the reciprocating stroke of the operating lever 103, a stopper member is provided in the form of a linear stopper cam 122 disposed in periphery of the substrate 108. The stopper cam 122 has a slanting cam face 123 which can come in abutment with a contact point 121 of the operating lever 103. The linear stopper cam 122 is fixed to an inner periphery of a movable cylinder member (not shown) along an axis of the cylinder member, and is displaced as indicated by the arrow together with the movement of the cylinder member. Consequently, the cam face 123 of the stopper cam 122 enters into the path of the contact point 121 of the operating lever 103 according to the displacement amount of the stopper cam 122.

Figure 7:
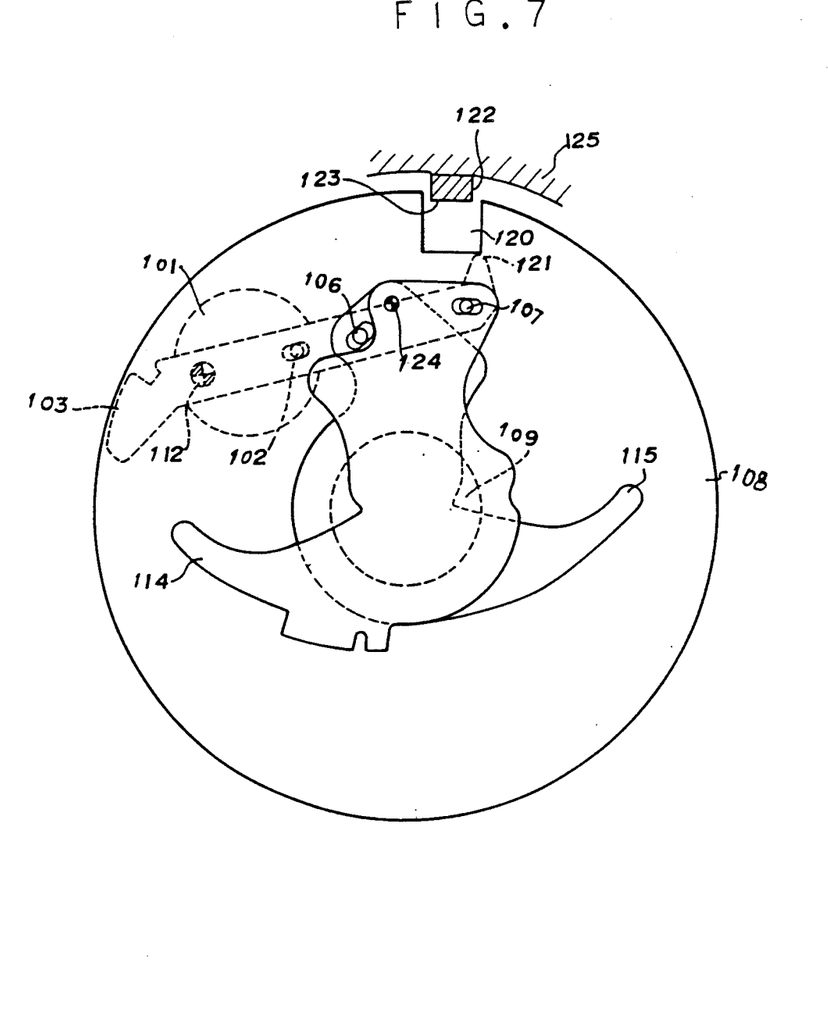
FIG. 7 is a plan view showing closed state of the FIG. 6 lens shutter part.
Figure 8:
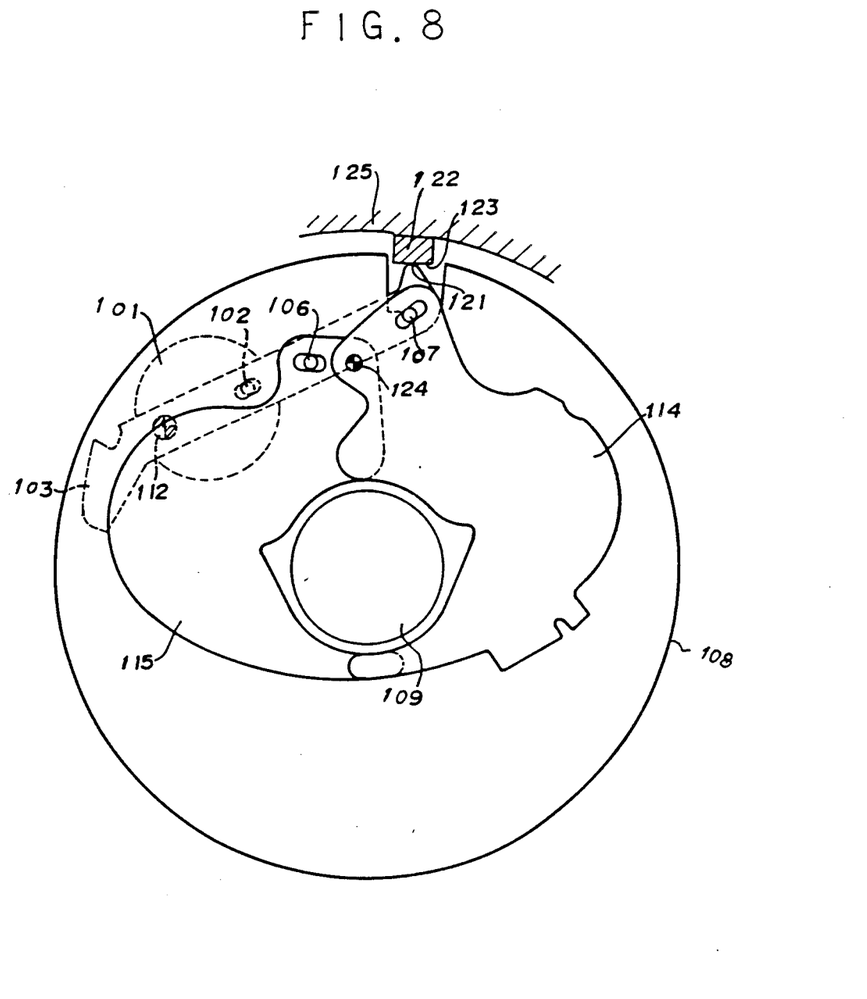
FIG. 8 is a plan view showing open state thereof.

FIG. 7 is a plan view of the shutter part after the setup of components of FIG. 6 embodiment, which is viewed from the lower side of the substrate to indicate the shutter closed state, and FIG. 8 is another plan view thereof to show the shutter open state. As shown in FIG. 7, the pair of blades 114 and 115 are rotatably supported around a common pivot pin 124 erected on the substrate 108, and are placed by the respective operating pins 106 and 107 fixed to the operating lever 103 in their rest position over the center of the substrate in superposed relation to each other to completely close the opening 109. The operating lever 103 pivotably supported around the pivot pin 112 is also placed in its rest position most clockwise in the drawing by the actuating pin 102 of the actuator 101. Further, the actuating pin 102 of the actuator 101 is set in its rest position most clockwise in the drawing.

In this arrangement, the stopper cam 122 is fixed to the movable cylinder member 125 which surrounds therein a periphery of the substrate 108. Therefore, the stopper cam 122 is positioned in place according to the axial movement of the cylinder member which occurs during the course of the zooming operation such that the cam face 123 enters into a recess 120 formed at the periphery of the substrate 108 in radially opposed relation to the contact point 121 of the operating lever 103. Consequently, the cam face 123 advances into the movement path of the contact point 121 so that the distance between the cam face 123 and the contact point 121 of the operating lever 103 in the rest position determines an effective forward stroke of the operating lever 103. The advancing amount of the cam face 123 is set according to the change of the focal distance by the zooming.

FIG. 8 is a plan view showing shutter open state in which the pair of blades 114 and 115 have been shifted from the FIG. 7 rest position to the open position. As shown in the figure, the operating lever 103 is rotated counterclockwise or forwardly from its rest position so that the pair of blades 114 and 115 are separated from each other and angularly shifted around the common pivot pin 124 away from the opening 109 to thereby open the opening 109. The blades 114 and 115 are operated or shifted by means of the operating pins 107 and 106 inserted into the respective slots formed in the blades. On the other hand, the operating lever 103 is pivoted counterclockwise in the forward direction along the given path around the pivot pin 112 by means of the actuating pin 102. At this time, the actuating pin 102 moves from its starting position counterclockwise in the forward direction along a given path.

In the state of FIG. 8, the cam face 123 of the stopper cam 122 is set such that the contact point 121 of the operating lever 103 comes into abutment with the cam face 123 to stop forward movement when the blades 114 and 115 reach their full open position. Accordingly, in this case, the effective aperture size of the lens system is adjusted to the full open diameter of the shutter according to the change of the focal distance due to zooming.

However, when reducing the aperture size of the lens system in response to the further change of the focal distance, the movable cylinder 125 is further displaced axially such that the slanting cam face 123 of the stopper cam 122 further enters with the movement of the cylinder member deeply into the movement path of the contact point 121 of the operating lever 103. Consequently, the cam face 123 further approaches to the contact point 121 of the operating lever 103 in the rest position so as to cut the forward movement stroke of the operating lever 103. As a result, the pair of blades 114 and 115 are stopped before they reach full open position due to the abutment of the operating lever 103 at its contact point 121 against the cam face 123 of the stopper cam 122 to thereby establish optimum effective aperture size and the optimum exposure amount.

Figure 9:
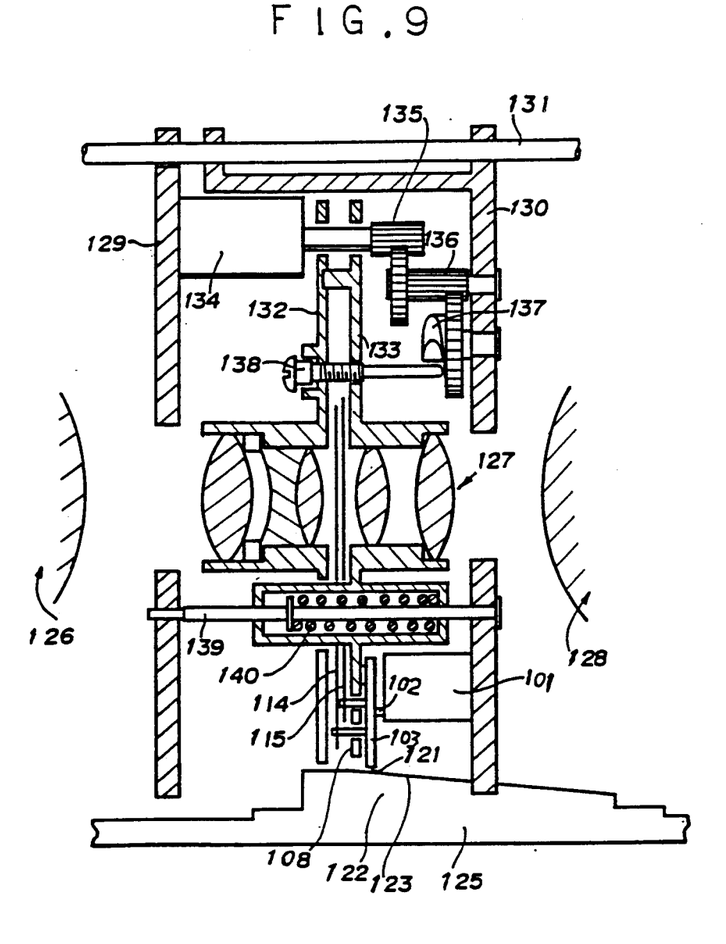
FIG. 9 is a sectional view of an essential part of the second embodiment of the camera according to the present invention, taken along the optical axis.

FIG. 9 is a sectional view showing a main part of the second embodiment of the inventive camera to illustrate AF mechanism, AE mechanism and part of zooming mechanism. A lens system is comprised of a first group 126 (partly shown) at the object side, a second group 127 in an axially intermediate position and a third group 128 (partly shown) at the film side. A front frame 129 and a rear frame 130 are spaced axially from each other and are guided along a zoom guide 131. A front lens sleeve 132 and a rear lens sleeve 133 are disposed between the front and rear frames 129 and 130 for supporting the second lens group 127, and are movable in the optical axis direction relative to the front and rear frames 129 and 130.

The AF mechanism is comprised of an AF stepping motor 134 fixed to the front frame 129, an AF cam 137 disposed on the rear frame 130 and driven by the stepping motor 134 through a pinion gear 135 and a transmission gear 136, an AF rod 138 disposed through opposed flange portions of the front and rear lens sleeves 132 and 133, and fixed at one end to the front lens sleeve 132 and in contact at the other end with the AF cam 137, an AF guide bar 139 fixed between the front and rear frames 129 and 130 along the optical axis to guide axial movement of the coupled front and rear lens sleeves 132 and 133, and a spring member 140 effective to bias the coupled front and rear lens sleeves 132 and 133 toward the rear frame 130.

Next, the zooming mechanism is comprised of a zooming means (not shown) for effecting manual or automatic zooming operation to displace the first lens group 126 and/or the third lens group 128 in the axial direction to change the focal distance of the lens system, a movable cylinder in the form of the zoom ring 125 responsive to the operation of the zooming means to undergo axially linear displacement, and a stopper cam 122 fixed to or integrated with the inner periphery of the zoom ring 125 along its axis.

Lastly, the AE mechanism is comprised of an electromagnetic actuator 101 of the moving magnet type mounted on the rear frame 130, an operating lever 103 and a pair of blades 114 and 115, the last three components being arranged on a substrate 108.

Referring to FIG. 9, the description is given for the sequential operation of AF, zooming and AE in the inventive camera device.

In the AF operation, a distance measurement means (not shown) is operated to measure a distance to the object so that a drive controlling circuit (not shown) applies signal pulses corresponding to a number of steps determined by the measured distance to the AF stepping motor 134. The AF stepping motor 134 is stepwise rotated to output torque effective to rotate the AF cam 137 through the pinion 135 and the transmission gear 136. The initial home position of AF cam 137 is set to upper or lower dead point according to the specification of the particular model of the camera. The AF rod 138 is displaced axially in response to the rotation of the AF cam 137 so that the front lens sleeve 132 is displaced forward along the AF guide bar 139 with the displacement of the AF rod 138 because the head screw portion of the AF rod 138 is coupled to the front lens sleeve 132. The rear lens sleeve 133 is concurrently displaced with the coupled front lens sleeve. However, the front and rear frames 129 and 130 are kept stationally in the axial direction. Only the front and rear lens sleeves 132 and 133 are displaced together with the blades 114 and 115 etc. In order to accurately control the axially forward displacement of the front and rear lens sleeves 132 and 133, these are always biased rearward by means of the spring member 140. In the AF operation, the maximum displacement span of the second lens group 127 is set about 2-3 mm in the compact camera. This maximum displacement span is divided into several tens steps to enable fine adjustment of focus.

In the subsequent zooming operation, the external zooming means (not shown) is operated according to the object distance to displace the first lens group 126 or third lens group 128 along the optical axis to set a desired focal distance. In response to this operation, the zoom ring 125 is displaced in the axial direction. Consequently, the cam face 123 of the stopper cam 122 fixed to the zoom ring advances into the reciprocating stroke path of the contact point 121 of the operating lever 103 by a determined displacement.

Lastly, the AE operation is effected. According to the exposure light amount information and the exposure time interval information fed from an exposure control circuit (not shown), the electromagnetic actuator 101 is initiated so that the actuating pin 102 moves from its rest position in the forward direction. Accordingly, the operating lever 103 is moved to undergo the forward stroke along the given path from the rest position and the blades 114 and 115 are consequently operated to start exposure. Subsequently, the contact point 121 of the operating lever 103 comes into abutment with the cam face 123 of the stop cam 122 to stop its forward stroke so that the blades 114 and 115 are held at the most open state to define the effective lens aperture. After the exposure, the output torque of the actuator 101 is reversed and the actuating pin 102 is moved rearward so that the operating lever 103 concurrently returns to the rest position to finish the exposure operation. Occasionally, the operating lever 103 may not move far forward beyond the set stroke when the required exposure light amount is rather small. In such case, the operating lever 103 may return to the rest position without abutment to the stopper cam 122.

As described above, in the second embodiment, the reciprocating stroke of the operating lever actuated by the electromagnetic actuator is adjusted effectively by the stopper cam according to the set focal distance. By such construction, the aperture stop size of the lens system can be always set optimum, thereby eliminating the use of the complicated and precious lens system which would be needed in the prior art.

Figure 10:
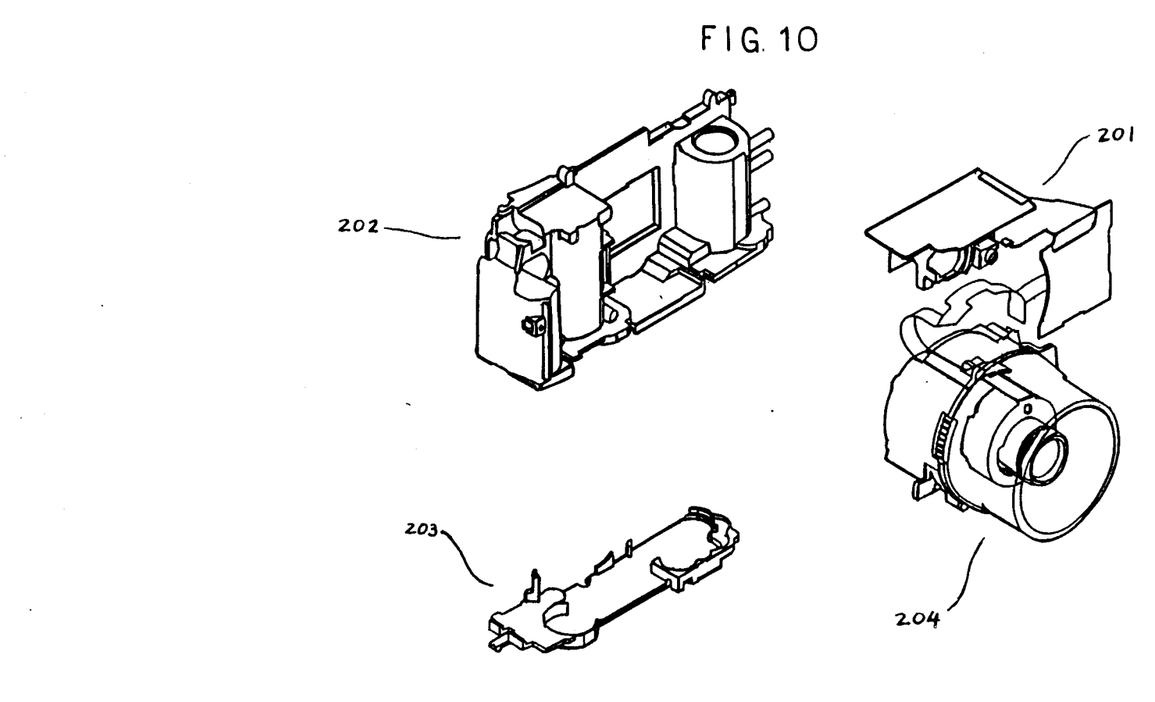
FIG. 10 is an overall schematic view of the inventive camera.

Finally, FIG. 10 shows overall structure of the inventive camera device, which has a finder 201, a camera body 202, a bottom plate 203 and a lens tube 204. The lens tube 204 contains a zooming lens system with a shutter operative according to the present invention. Further, the finder 201 contains therein the object distance measurement means and the object brightness measurement means.

What is claimed is:

1. A camera apparatus comprising: lens means operable to effect zooming to change focal distance; blade means operable during exposure to shift forwardly from its home position to open the lens means through a given shift amount effective to determine an aperture of the lens means and subsequently to shift reversely to close the lens means; driving means movable through a given reciprocating stroke for driving forwardly and reversely the blade means to effect opening and closing of the lens means; support means for supporting the blade means and the driving means; and adjusting means disposed around the support means to undergo a displacement in response to the zooming of the lens means to act on the driving means so as to control the reciprocating stroke of the driving means according to the displacement to thereby limit the shift amount of the blade means for adjusting the aperture of the lens means according to the zooming.

2. A camera apparatus according to claim 1; wherein the driving means includes operating means linked to the blade means for operating the blade means and actuating means operative to undergo movement through a reciprocating stroke through a predetermined path for actuating the operating means, and the adjusting means includes a stopper member operable in response to the zooming of the lens means for undergoing displacement to enter the path of the actuating means to limit its reciprocating stroke.

3. A camera apparatus according to claim 2; wherein the adjusting means includes a movable cylinder member disposed around the support means and linked to the lens means to undergo movement during the course of the zooming, and an adjusting member fixed to the cylinder member for the movement therewith to act on the stopper member for adjusting the displacement of the stopper member.

4. A camera apparatus according to claim 3; wherein the movable cylinder member comprises a zoom ring rotatable circumferentially of the lens means.

5. A camera apparatus according to claim 4; wherein the adjusting member comprises an adjusting cam disposed on an inner periphery of the zoom ring in contact with the stopper member.

6. A camera apparatus according to claim 4; wherein the adjusting member comprises a push pin fixed in parallel to an axis of the zoom ring within the zoom ring for the movement therewith so as to act on the stopper member.

7. A camera apparatus according to claim 2; wherein the actuating means comprises an electromagnetic actuator of the moving magnet type having an actuating pin undergoing a reciprocating stroke along a given path in engagement with the operating means.

8. A camera apparatus according to claim 7; wherein the stopper member comprises a stopper cam disposed pivotably on the support means for controlling the reciprocating stroke of the actuating pin according to pivotal displacement of the stopper cam.

9. A camera apparatus according to claim 1; wherein the driving means includes operating means linked to the blade means and movable along a given path to undergo a reciprocating stroke so as to operate the blade means and actuating means for actuating the operating means, and the adjusting means includes a stopper member responsive to the zooming of the lens means to undergo displacement to enter into the path of the operating means so as to control the reciprocating stroke thereof.

10. A camera apparatus according to claim 9; wherein the adjusting means includes a movable cylinder member disposed around the support means and linked to the lens means for the movement therewith during the course of the zooming, and wherein the stopper member is fixed to the movable cylinder member for the displacement therewith.

11. A camera apparatus according to claim 10; wherein the movable cylinder member comprises a zoom ring linearly movable in an optical axis direction of the lens system and the stopper member comprises a stopper cam disposed on an inner periphery of the zoom ring along the optical axis direction.

12. A camera apparatus according to claim 11; wherein the operating means includes an operating lever for undergoing a pivotal stroke along a given path such that the operating lever is brought into abutment with the stopper cam during the course of the pivotal stroke.

* * * * *

UNITED STATES PATENT AND TRADEMARK OFFICE
CERTIFICATE OF CORRECTION

PATENT NO. : 4,987,435
DATED : January 22, 1991
INVENTOR(S) : TOUMA et al.

It is certified that error appears in the above-identified patent and that said Letters Patent is hereby corrected as shown below:

Title page and Column 1, lines 2 and 3

The title of the invention should read:

COMPACT CAMERA WITH [APPARATUS] APERTURE
SIZE ADJUSTMENT BY ZOOMING

Signed and Sealed this

Eighteenth Day of August, 1992

Attest:

DOUGLAS B. COMER

*Attesting Officer*  *Acting Commissioner of Patents and Trademarks*